(12) United States Patent
Kolavennu et al.

(10) Patent No.: US 11,403,734 B2
(45) Date of Patent: Aug. 2, 2022

(54) SYSTEMS AND METHODS FOR CONVERTING LOW RESOLUTION IMAGES INTO HIGH RESOLUTION IMAGES

(71) Applicant: Ademco Inc., Golden Valley, MN (US)

(72) Inventors: Soumitri Kolavennu, Plymouth, MN (US); Nathaniel Kraft, Minnetonka, MN (US)

(73) Assignee: Ademco Inc., Golden Valley, MN (US)

( * ) Notice: Subject to any disclaimer, the term of this patent is extended or adjusted under 35 U.S.C. 154(b) by 282 days.

(21) Appl. No.: 16/850,719

(22) Filed: Apr. 16, 2020

(65) Prior Publication Data

US 2021/0209733 A1    Jul. 8, 2021

Related U.S. Application Data

(60) Provisional application No. 62/957,869, filed on Jan. 7, 2020.

(51) Int. Cl.
*G06K 9/00* (2022.01)
*G06T 3/40* (2006.01)
(Continued)

(52) U.S. Cl.
CPC ......... *G06T 3/4076* (2013.01); *G06N 3/0454* (2013.01); *G06N 3/08* (2013.01); *G06T 3/4046* (2013.01)

(58) Field of Classification Search
CPC ... G06T 3/4076; G06T 3/4046; G06N 3/0454; G06N 3/08
(Continued)

(56) References Cited

U.S. PATENT DOCUMENTS

| 7,634,662 B2 | 12/2009 | Monroe |
| 10,140,718 B2 | 11/2018 | Chen et al. |

(Continued)

FOREIGN PATENT DOCUMENTS

| CN | 108921001 A | 11/2018 |
| CN | 110414305 A | 11/2019 |
| WO | 2019202587 A1 | 10/2019 |

OTHER PUBLICATIONS

Yang, Wenming, et al. "LCSCNet: Linear compressing-based skip-connecting network for image super-resolution." IEEE Transactions on Image Processing 29 (2019): 1450-1464. (Year: 2019).*

(Continued)

*Primary Examiner* — Jonathan S Lee
(74) *Attorney, Agent, or Firm* — Fredrikson & Byron, P.A.

(57) ABSTRACT

Systems and methods for converting low resolution images into high resolution images are provided and can include (1) processing a compressed version of images with a first set of heuristics and rules of an artificial intelligence model to produce an intermediate version of the images with an intermediate resolution that is greater than the compressed resolution by first enhancing the images and subsequently upscaling the images as enhanced from the compressed resolution to the intermediate resolution and (2) processing the intermediate version of the images with a second set of heuristics and rules of the artificial intelligence model to produce a final version of the images with a final resolution that is greater than the initial resolution and the intermediate resolution by first upscaling the images from the intermediate resolution to the final resolution and subsequently enhancing the images as upscaled to produce the final version of the images.

20 Claims, 5 Drawing Sheets

(51) Int. Cl.
   *G06N 3/04* (2006.01)
   *G06N 3/08* (2006.01)
(58) Field of Classification Search
   USPC .......................................................... 382/299
   See application file for complete search history.

(56) References Cited

U.S. PATENT DOCUMENTS

| | | | |
|---|---|---|---|
| 10,475,311 | B2 | 11/2019 | Siminoff |
| 10,489,887 | B2 | 11/2019 | El-Khamy et al. |
| 10,861,265 | B1 | 12/2020 | Merkley et al. |
| 2004/0005086 | A1 | 1/2004 | Wolff et al. |
| 2009/0222388 | A1 | 9/2009 | Hua et al. |
| 2014/0032538 | A1 | 1/2014 | Arngren et al. |
| 2016/0065861 | A1 | 3/2016 | Steinberg et al. |
| 2016/0132720 | A1 | 5/2016 | Klare et al. |
| 2016/0196467 | A1 | 7/2016 | Xia |
| 2017/0083790 | A1 | 3/2017 | Risinger et al. |
| 2017/0085844 | A1 | 3/2017 | Scalisi et al. |
| 2018/0285648 | A1 | 10/2018 | Pan et al. |
| 2018/0307903 | A1 | 10/2018 | Siminoff |
| 2019/0035242 | A1 | 1/2019 | Vazirani |
| 2019/0130278 | A1 | 5/2019 | Karras et al. |
| 2019/0130583 | A1 | 5/2019 | Chen et al. |
| 2019/0188980 | A1 | 6/2019 | Viswanathan et al. |
| 2019/0373186 | A1 | 12/2019 | Ortiz Egea et al. |
| 2020/0019921 | A1 | 1/2020 | Buibas et al. |
| 2020/0242336 | A1 | 7/2020 | Boic |
| 2021/0152880 | A1 | 5/2021 | Marten et al. |
| 2021/0209349 | A1 | 7/2021 | Mehl et al. |

OTHER PUBLICATIONS

Yang, Yuxiang, et al. "Depth map super-resolution using stereo-vision-assisted model." Neurocomputing 149 (2015): 1396-1406. (Year: 2015).*
Wang, Yifan, et al. "Resolution-aware network for image super-resolution." IEEE Transactions on Circuits and Systems for Video Technology 29.5 (2018): 1259-1269. (Year: 2018).*
Wei, Wei, et al. "Unsupervised recurrent hyperspectral imagery super-resolution using pixel-aware refinement." IEEE Transactions on Geoscience and Remote Sensing 60 (2020): 1-15. (Year: 2020).*
Xu Jia et al.: "Super-Resolution with Deep Adaptive Image Resampling", arxiv.org, Cornell University Library, Ithaca, NY 14853, Dec. 18, 2017, 10 pgs.
Lai Wei-Sheng et al.: "Deep Laplacian Pyramid Networks for Fast and Accurate Super-Resolution", 2017 IEEE Conference on Computer Vision and Pattern Recognition, IEEE Computer Society, US, Jul. 21, 2017, 9 pgs.
Extended European Search Report for European Patent Application No. 20187038.3, dated Oct. 22, 2020, 8 pgs.
Zhao, Liang, et al., "Stereo- and Neural Network-Based Pedestrian Detection," Sep. 2000, IEEE Transactions on Intelligent Transportation Systems (vol. 1, Issue: 3, Sep. 2000), pp. 148-152.
Chan, Chee Seng, et al., "A Fuzzy Qualitative Approach to Human Motion Recognition," Sep. 23, 2008, 2008 IEEE International Conference on Fuzzy Systems (IEEE World Congress on Computational Intelligence), pp. 1242-1247.
Yan, Zhennan, et al., "Multi-Instance Deep Learning: Discover Discriminative Local Anatomies for Bodypart Recognition," Feb. 3, 2016, IEEE Transactions on Medical Imaging, vol. 35, No. 5, May 2016, pp. 1333-1340.
Nadeem, Amir, et al., Automatic human posture estimation for sport activity recognition with robust body parts detection and entropy markov model,Mar. 16, 2021, Multimedia Tools and Applications (2021) 80:21465-21498, pp. 21466-21480.
Jalal, Ahmed, et al., "A Depth Video-based Human Detection and Activity Recognition using Multi-features and Embedded Hidden Markov Models for Health Care Monitoring Systems," Jan. 2017, International Journal of nteractive Multimedia and Artificial Intelligence,vol. 4, N°4,https://www.researchgate.net/publication/312483, 10 pgs.
Rechelle Ann Fuertes, Max Planck Institute for Intelligent Systems, New EnhanceNet-Pat AI Turns Low-Resolution Images into Hign-Res., http://edgy.app/new-ai-system-to-turn-low-resolution-images-to-high-resolution, Oct. 30, 2017.
Christopher Thomas, BSc Hons., MIAP, Deep learning based super resolution, without using a GAN, Feb. 24, 2019 https://towardsdatascience.com/deep-learning-based-super-resolution-without-using-a-gan- . . . .
Sajjad et al., Max Planck Institute for Intelligent Systems, EnhanceNet: Single Image Super-Resolution Through Automated Texture Sythesis, Jan. 27, 2020.
Paul, et al., EURASIP Journal on Advances in Signal Processing, Human detection in surveillance videos and its applications a review, 2013, http://asp.eurasipjournals.com/content/2013/1/176, 16 pgs.
Europe IBM Intelligent Video Analytics V3.0, 5725-H94 IBM Intelligent Video Analytics V3.0, IBM Europe Sales Manual, Revised Apr. 23, 2019, https://www-01.ibm.com/common/ssi/ShowDoc.wss?docURL=/common/ssi/rep_sm/4/877/ENUS5725-H94/index.html&lang=en&request_locale=en, 15 pgs.
Taking Motion Analytics to a New Level With AI, AI Motion Analytics Software Solutions, Artificial Intelligence, Jan. 9, 2020, https://www.osplabs.com/ai-motion-analytics/, 4 pgs.

* cited by examiner

SYSTEMS AND METHODS FOR CONVERTING LOW RESOLUTION IMAGES INTO HIGH RESOLUTION IMAGES

CROSS REFERENCE TO RELATED APPLICATIONS

This application claims priority to U.S. Provisional Patent Application No. 62/957,869 filed Jan. 7, 2020 and titled "SYSTEMS AND METHODS FOR CONVERTING LOW RESOLUTION IMAGES INTO HIGH RESOLUTION IMAGES." U.S. Provisional Patent Application No. 62/957,869 is hereby fully incorporated by reference as if set forth fully herein.

FIELD

The present invention relates generally to systems and methods for image processing. More particularly, the present invention relates to systems and methods for converting low resolution images into high resolution images.

BACKGROUND

The prominence, prevalence, and recording fidelity of video and image recording devices have greatly expanded in recent years, and these changes have made storage and transmission of such large amounts of large and/or high resolution images difficult and costly. For example, a 30-second video data stream with 1080p HD resolution can require 8 MB of storage space and incur some amount of transfer latency when transmitted via a low bandwidth connection, such as a cellular network. Furthermore, because most data storage services charge a set price per megabyte or gigabyte of data, there is a need and an opportunity for systems and methods that can compress video data streams to reduce the storage space required, for example, by only requiring 450 KB of the storage space for the 30-second video data stream with the 1080p HD resolution, thereby resulting in savings for users, without sacrificing the recording fidelity of the video data streams when accessed.

Further still, the increased fidelity of newer imaging devices has resulted in user dissatisfaction with otherwise functional legacy devices that output images and video at lower fidelity resolutions than the newer imaging devices. Accordingly, there is a need and an opportunity for systems and methods that can effectively enhance and upscale any output of these legacy devices.

DETAILED DESCRIPTION

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for converting low resolution images into high resolution images. For example, such systems and methods can include a first camera that records a sequence of images with a camera resolution, a memory device that stores the sequence of images with a compressed resolution, a processor, and a transceiver.

In some embodiments, the compressed resolution can be lower than the camera resolution, and in some embodiments, the camera resolution can include a high fidelity resolution, such as 1080p or 4K. In these embodiments, the first camera or a separate encoder device can convert the sequence of images from the camera resolution to the compressed resolution for storage on the memory device. For example, the first camera or the separate encoder device can down convert the sequence of images from the high fidelity resolution to VGA, QVGA, or another low fidelity resolution that requires less storage space on the memory device than the high fidelity resolution. Alternatively, in some embodiments, the first camera can record the sequence of images with the compressed resolution such that the camera resolution is equal to the compressed resolution.

Responsive to receiving a request for the sequence of images from a source device, the processor can retrieve the sequence of images from the memory device and process the sequence of images, and the transceiver can transmit the sequence of images as processed to the source device. For example, in some embodiments, the processor can process the sequence of images with a two-stage enhancement and upscaling process. In a first stage of the two-stage enhancement and upscaling process, the processor can process the sequence of images with the compressed resolution with a first set of heuristics and rules of an artificial intelligence model to produce an intermediate version of the sequence of images with an intermediate resolution that is greater than the compressed resolution. Then, in a second stage of the two-stage enhancement and upscaling process, the processor can processes the intermediate version of the sequence of images with a second set of heuristics and rules of the artificial intelligence model to produce a final version of the sequence of images with a final resolution that is greater than the initial resolution and the intermediate resolution. In some embodiments, the final resolution can be equal to the camera resolution, for example, in embodiments in which the camera resolution is equal to the high fidelity resolution. However, in some embodiments, the final resolution can be less than the camera resolution and can be based on one or more of user input received with the request for the sequence of images, a type of the source device, or a type of a connection to the source device.

In some embodiments, the first set of heuristics and rules of the artificial intelligence model can first enhance the sequence of images with the compressed resolution and subsequently upscale the sequence of images as enhanced from the compressed resolution to the intermediate resolution. For example, the first set of heuristics and rules of the artificial intelligence model can first enhance the sequence of images with the compressed resolution on a frame-by-frame basis using convolution, strengthening, and/or dense blocks and subsequently upscale the sequence of images as enhanced to the intermediate version of the sequence of images.

In some embodiments, the second set of heuristics and rules of the artificial intelligence model can first upscale the sequence of images from the intermediate resolution to the final resolution and subsequently enhance the sequence of images as upscaled to produce the final version of the sequence of images. For example, the second set of heuristics and rules of the artificial intelligence model can first upscale the intermediate version of the sequence of images on a frame-by-frame basis from the intermediate resolution to the final resolution and subsequently enhance the sequence of images as upscaled using convolution and sharpening to produce the final version of the sequence of images. In some embodiments, the intermediate resolution can be two times the compressed resolution, and in some embodiments, the final resolution can be four times the intermediate resolution.

Various embodiments of the memory device, the processor, and the transceiver are contemplated. For example, in some embodiments, some or all of the memory device, the processor, and the transceiver can be located on or can be a part of a cloud server that is remote from both the first camera and the source device. Additionally or alternatively, in some embodiments, some or all of the memory device, the processor, and the transceiver can be integrated with the first camera or another device that is locally connected to the first camera, such as a control panel of a security system that controls the first camera. Additionally or alternatively, in some embodiments, the processor can be a part of the source device, and the memory device and the transceiver can be a part of the control panel, a part of the cloud server, or integrated with the first camera. In these embodiments, the memory device can transmit the sequence of images with the compressed resolution to the source device via the transceiver, and the processor can process the sequence of images with the compressed resolution with the first set of heuristics and rules of the artificial intelligence model and the second set of heuristics and rules of the artificial intelligence model on the source device as described herein.

Figure 1:
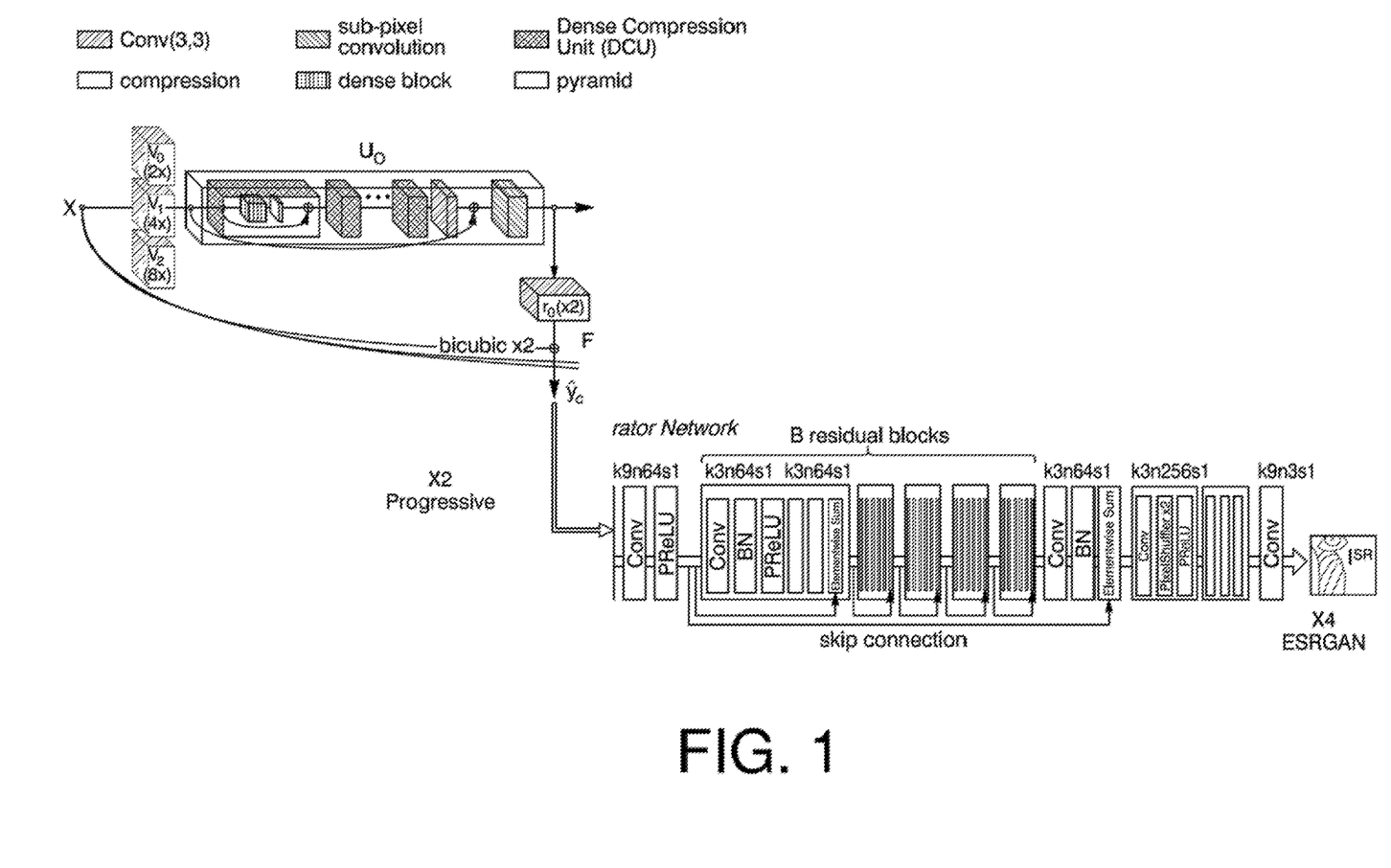
FIG. 1 is a block diagram of a two-stage image enhancer and upscaler according to disclosed embodiments.

As seen in FIG. 1, in some embodiments, the first stage of the two-stage enhancement and upscaling process can include a progressive super resolution process, and the second stage of the two-stage enhancement and upscaling process can include an enhanced super resolution process. However, in any embodiment, the two-stage enhancement and upscaling process as described herein can enhance both micro and macro features of the sequence of images and produce a measurable improvement on a peak signal to noise ratio metric as compared to a one-stage enhancement and upscaling method.

Figure 2:
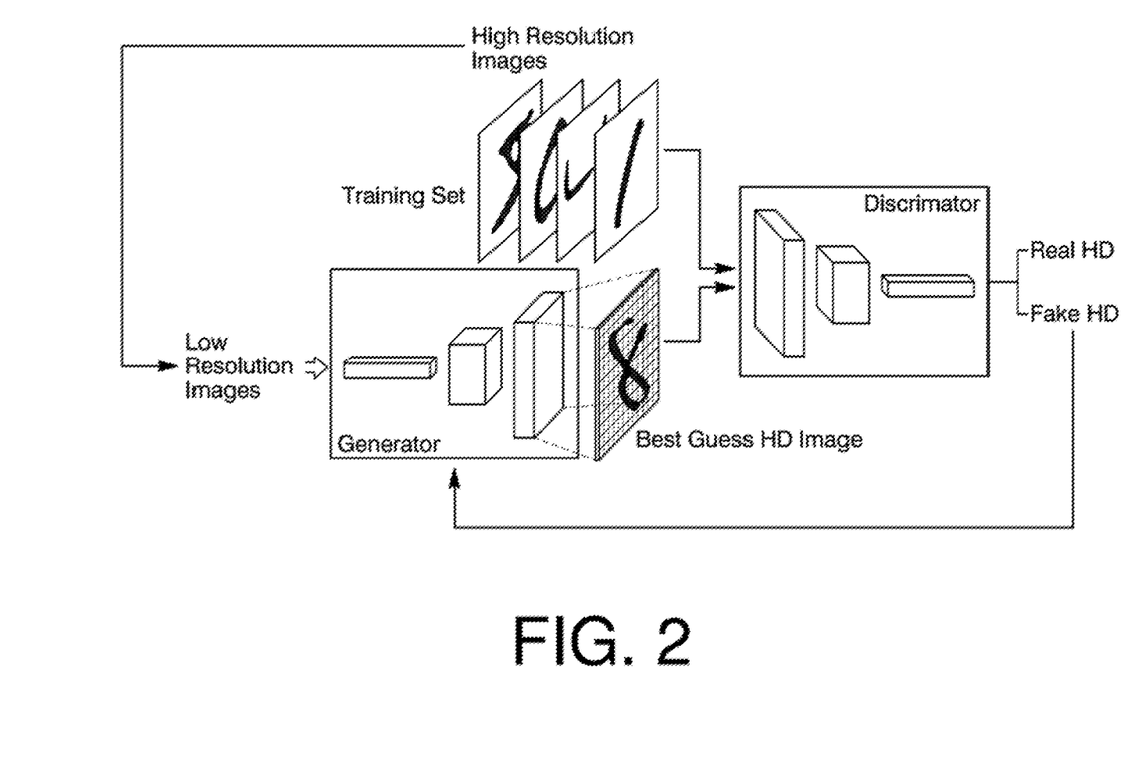
FIG. 2 is a flow diagram of a method of training an artificial intelligence model according to disclosed embodiments.
Figure 3:
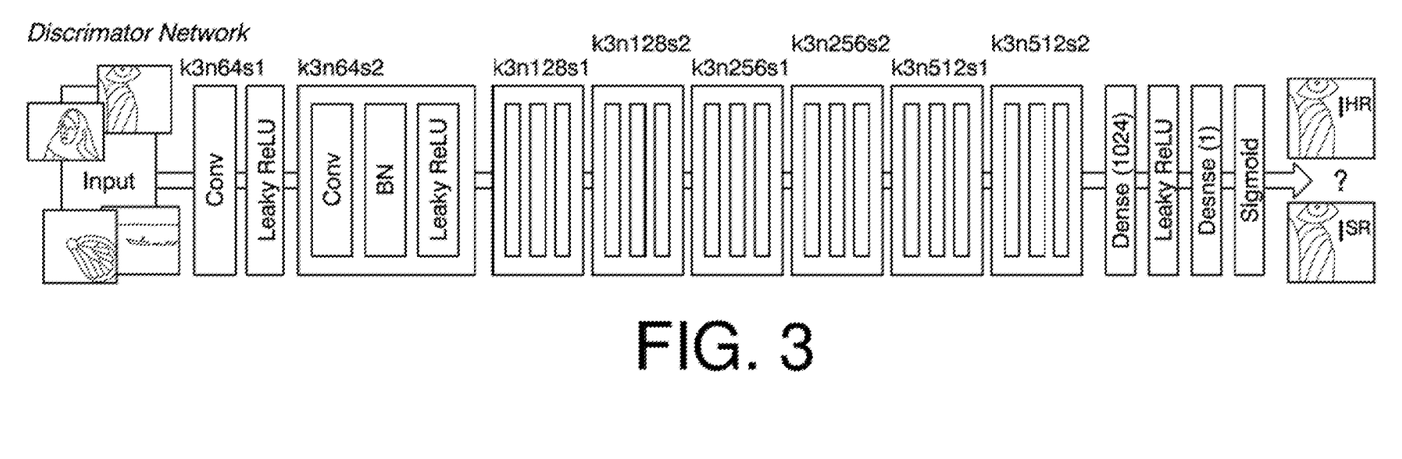
FIG. 3 is a block diagram of a discriminator network according to disclosed embodiments.

As seen in FIG. 2, in some embodiments, the first set of heuristics and rules of the artificial intelligence model and the second set of heuristics and rules of the artificial intelligence model can be developed from an iterative training process. For example, in some embodiments, the iterative training process can include (1) the artificial intelligence model receiving a low resolution version of training images that are compressed from a genuine high resolution version of the training images, (2) the artificial intelligence model processing the low resolution version of the training images with the first set of heuristics and rules of the artificial intelligence model to output an intermediate resolution version of the training images, (3) the artificial intelligence model processing the intermediate resolution version of the training images with the second set of heuristics and rules of the artificial intelligence model to output an artificial high resolution version of the training images, (4) comparing, for example, by a discriminator network, as seen in FIG. 3, the artificial high resolution version of the training images to the genuine high resolution version of the training images to identify an amount of difference therebetween, and (5) back-propagating the amount of the difference to the artificial intelligence model to adjust the first set of heuristics and rules of the artificial intelligence model and the second set of heuristics and rules of the artificial intelligence model so as to decrease the amount of difference at future times. In effect, the iterative training process can teach the artificial intelligence model to appropriately add missing pixels to the sequence of images when upscaled.

Figure 4:
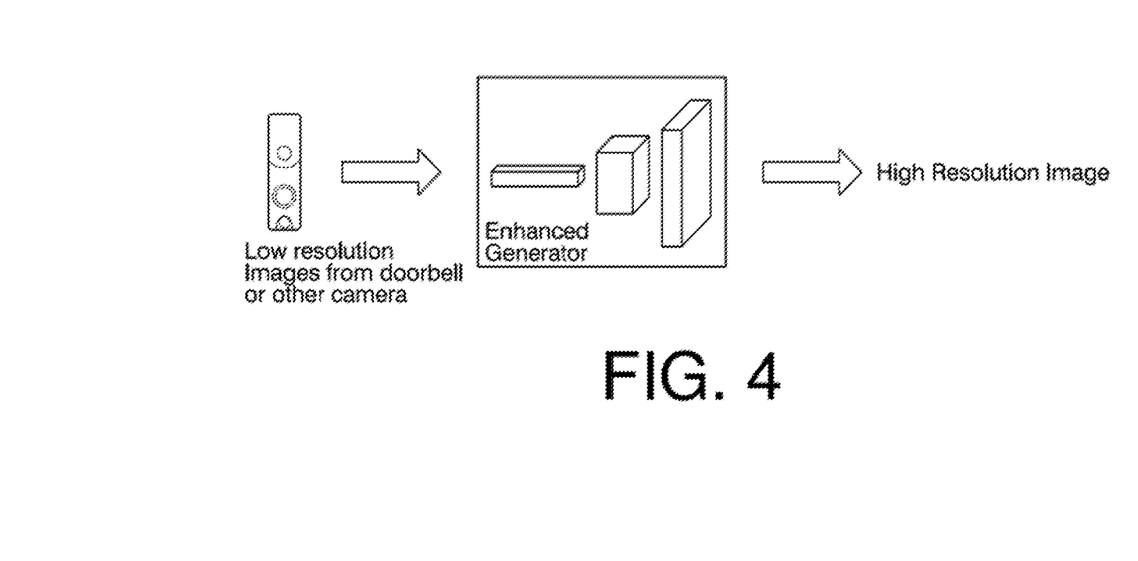
FIG. 4 is a flow diagram of a method of image enhancement according to disclosed embodiments.

Various embodiments for sourcing the genuine high resolution version of the training images are contemplated. For example, in some embodiments, the genuine high resolution version of the training images can include generic images of people and places that need not be customized for the first camera or a location or an area monitored by the first camera. However, in some embodiments, the training images can include specialized images that depict the location or the area monitored by the first camera. Training the artificial intelligence model with the specialized images can offer an improvement over training the artificial intelligence model with the generic images because doing so can generate and adjust the heuristics and the rules to account for specific features unique to the location or the area monitored by the first camera, thereby more accurately enhancing and upscaling the sequence of images captured by the first camera during normal operation, for example, as seen in FIG. 4. In these embodiments, the memory device can cross-reference the artificial intelligence model with the first camera or the location or the area monitored by the first camera to identify the artificial intelligence model trained for use on the sequence of images captured by that camera at that location.

Various embodiments for obtaining the specialized images are contemplated. For example, in some embodiments, the first camera can be programmed to generate the specialized images by outputting the genuine high resolution version of the training images for a predetermined period of time after installation in the location or the area monitored by the first camera. In these embodiments, the first camera can capture the genuine high resolution version of the training images, and the first camera or the separate encoder device can compress the genuine high resolution of the training images into the low resolution version of the training images. Alternatively, in embodiments in which the camera resolution is equal to the compressed resolution, a second camera, for example, one that is associated with a user device and/or has a capture resolution that is greater than the compressed resolution (e.g. the high fidelity resolution), can generate the specialized images by capturing the genuine high resolution version of the training images depicting the location or the area monitored by the first camera.

In some embodiments, a difference between the camera resolution and the compressed resolution can be equal to a maximum enhancement capability of the artificial intelligence model as identified during the training process. For example, in some embodiments, the maximum enhancement capability can be based on user feedback regarding an acceptability of the artificial high resolution version of the training images.

Similarly, in some embodiments, the first set of heuristics and rules of the artificial intelligence model and the second set of heuristics and rules of the artificial intelligence model can be adjusted based on the user feedback as to a quality of the final version of the sequence of images output by the systems and the methods as described herein during normal operation. For example, if the user feedback is negative, then the systems and the methods as described herein can adjust the first set of heuristics and rules of the artificial intelligence model and the second set of heuristics and rules of the artificial intelligence model to improve the final version of the sequence of images at future times. Alternatively, if the user feedback is positive, then the systems and the methods as described herein can refrain from adjusting the first set of heuristics and rules of the artificial intelligence model and the second set of heuristics and rules of the artificial intelligence model.

In embodiments in which the first camera records the sequence of images with the high fidelity resolution and the camera or the separate encoder device down converts the sequence of images from the high fidelity resolution to the compressed resolution for storage on the memory device, a user can preprogram an amount of such down converting. However, the camera and the separate encoder device can refrain from down converting the sequence of images when an object of interest is detected within the sequence of images and/or when an alarm state is triggered by another device in communication the first camera.

Figure 5:
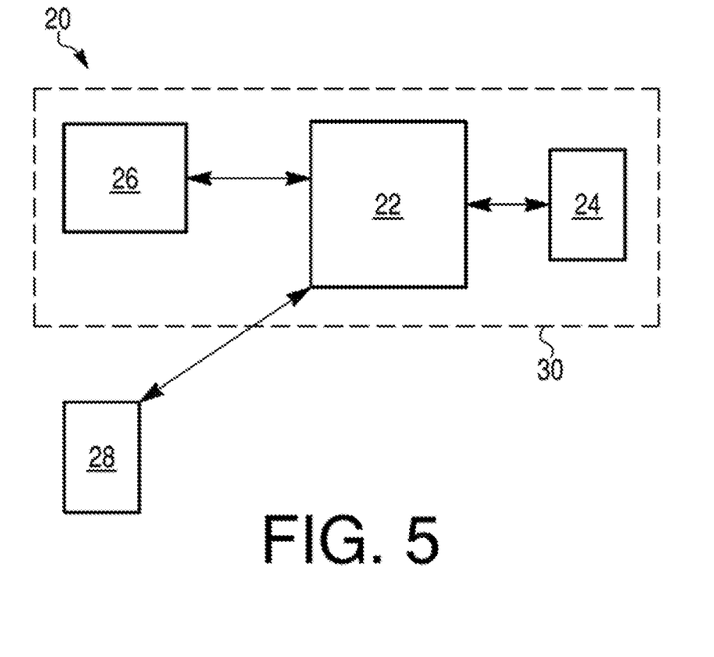
FIG. 5 is a block diagram of a system according to disclosed embodiments.
Figure 6:
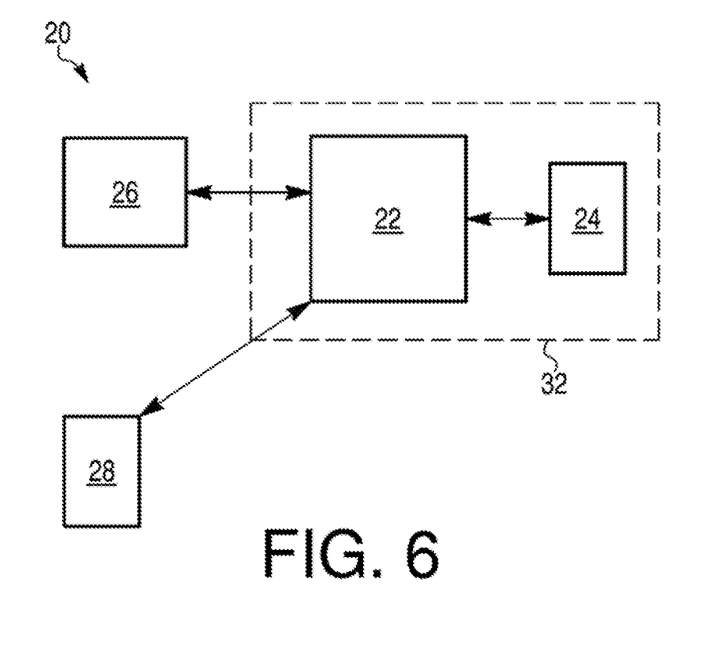
FIG. 6 is a block diagram of a system according to disclosed embodiments.

FIG. 5 and FIG. 6 are block diagrams of a system 20 according to disclosed embodiments. As seen in FIG. 5 and FIG. 6, the system 20 can include a processor 22, a memory device 24, a camera 26, and a user device 28. As seen in FIG. 5, in some embodiments, the processor 22, the memory device 24, and the camera 26 can be collocated in a single device 30, such as a doorbell device or a control panel. However, as seen in FIG. 6, in some embodiments, the processor 22 and the memory device 24 can be collocated in a device 32 that is separate from the camera 26, such as a remotely located cloud server that can communicate with the camera 26 and the user device 28 via a wide area network.

Figure 7:
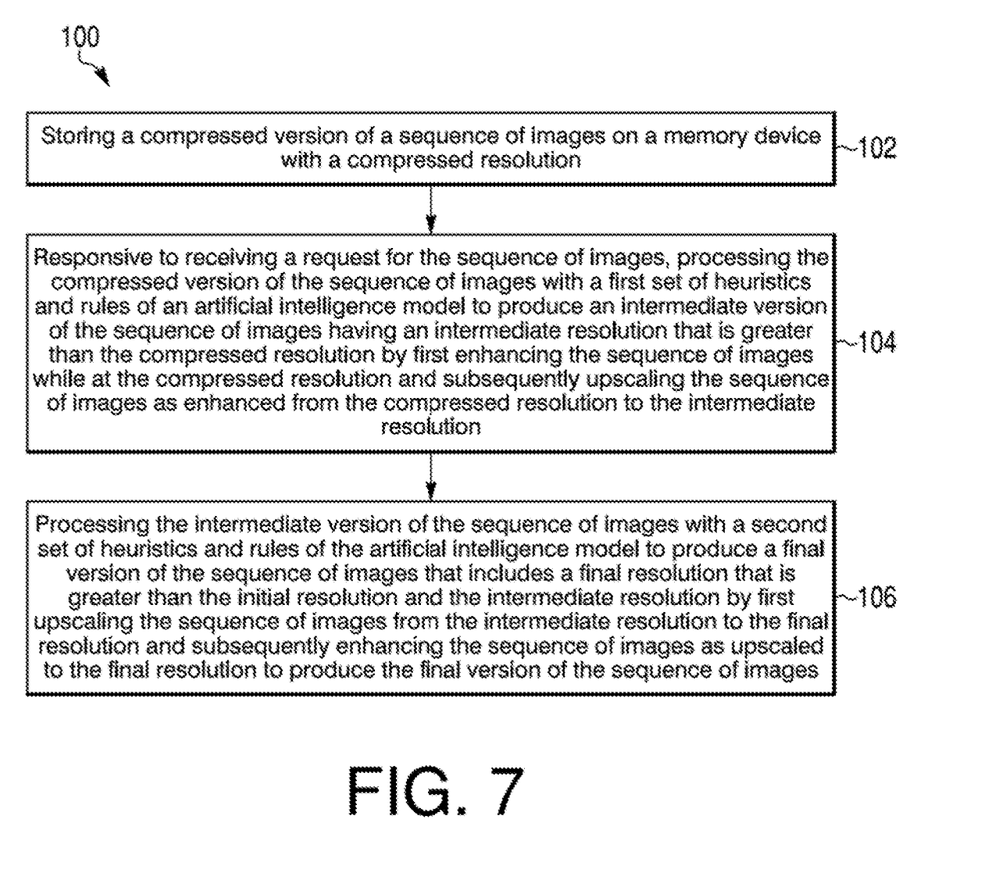
FIG. 7 is a flow diagram of a method according to disclosed embodiments.

FIG. 7 is a flow diagram of a method 100 according to disclosed embodiments. As seen in FIG. 7, the method can include storing a compressed version of a sequence of images on the memory device 24 with a compressed resolution, as in 102. Responsive to receiving a request for the sequence of images from the user device 28, the method 100 can include processing the compressed version of the sequence of images with a first set of heuristics and rules of an artificial intelligence model to produce an intermediate version of the sequence of images with an intermediate resolution that is greater than the compressed resolution by first enhancing the sequence of images with the compressed resolution and subsequently upscaling the sequence of images as enhanced from the compressed resolution to the intermediate resolution, as in 104. Finally, the method 100 can include processing the intermediate version of the sequence of images with a second set of heuristics and rules of the artificial intelligence model to produce a final version of the sequence of images with a final resolution that is greater than the initial resolution and the intermediate resolution by first upscaling the sequence of images from the intermediate resolution to the final resolution and subsequently enhancing the sequence of images as upscaled to produce the final version of the sequence of images, as in 106.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a memory device that stores a compressed version of a sequence of images with a compressed resolution; and
   a processor that, responsive to receiving a request for the sequence of images, (1) processes the compressed version of the sequence of images with a first set of heuristics and rules of an artificial intelligence model to produce an intermediate version of the sequence of images with an intermediate resolution that is greater than the compressed resolution and (2) processes the intermediate version of the sequence of images with a second set of heuristics and rules of the artificial intelligence model to produce a final version of the sequence of images with a final resolution that is greater than the initial resolution and the intermediate resolution,
   wherein the first set of heuristics and rules of the artificial intelligence model first enhances the sequence of images with the compressed resolution and subsequently upscales the sequence of images as enhanced from the compressed resolution to the intermediate resolution, and wherein the second set of heuristics and rules of the artificial intelligence model first upscales the sequence of images from the intermediate resolution to the final resolution and subsequently enhances the sequence of images as upscaled to produce the final version of the sequence of images.

2. The system of claim 1 wherein the first set of heuristics and rules of the artificial intelligence model and the second set of heuristics and rules of the artificial intelligence model are developed from a training process that includes (1) the artificial intelligence model receiving a low resolution version of training images that are compressed from a genuine high resolution version of the training images, (2) the artificial intelligence model processing the low resolution version of the training images with the first set of heuristics and rules of the artificial intelligence model to output an intermediate resolution version of the training images, (3) the artificial intelligence model processing the intermediate resolution version of the training images with the second set of heuristics and rules of the artificial intelligence model to output an artificial high resolution version of the training images, (4) comparing the artificial high resolution version of the training images to the genuine high resolution version of the training images to identify an amount of difference therebetween, and (5) back-propagating the amount of the difference to the artificial intelligence model to adjust the first set of heuristics and rules of the artificial intelligence model and the second set of heuristics and rules of the artificial intelligence model so as to decrease the amount of the difference at future times.

3. The system of claim 2 further comprising:
   a camera that captures the sequence of images with a camera resolution that is greater than the compressed resolution, wherein a difference between the camera resolution and the compressed resolution is equal to a maximum enhancement capability of the artificial intelligence model as determined during the training process.

4. The system of claim 3 wherein the final resolution is equal to the camera resolution.

5. The system of claim 3 wherein the camera captures the genuine high resolution version of the training images with the camera resolution.

6. The system of claim 3 wherein the maximum enhancement capability is based on user feedback regarding an acceptability of the artificial high resolution version of the training images.

7. The system of claim 3 wherein the final resolution is less than the camera resolution and is based on one of user input received with the request for the sequence of images, a type of a source device that is a source of the request for the sequence of images, or a type of a connection to the source device.

8. The system of claim 2 further comprising:
a first camera that captures the sequence of images with the compressed resolution.

9. The system of claim 8 wherein the genuine high resolution version of the training images are captured by a second camera with a capture resolution that is greater than the compressed resolution, wherein the second camera is associated with a user device, and wherein the genuine high resolution version of the training images depict an area monitored by the first camera.

10. The system of claim 1 further comprising:
a transceiver that transmits the final version of the sequence of images to a source device that is a source of the request for the sequence of images,
wherein the memory device is collocated with the processor in a cloud server that is remote from both the source device and a camera that captured the sequence of images.

11. A method comprising:
storing a compressed version of a sequence of images on a memory device with a compressed resolution;
responsive to receiving a request for the sequence of images, processing the compressed version of the sequence of images with a first set of heuristics and rules of an artificial intelligence model to produce an intermediate version of the sequence of images with an intermediate resolution that is greater than the compressed resolution by first enhancing the sequence of images with the compressed resolution and subsequently upscaling the sequence of images as enhanced from the compressed resolution to the intermediate resolution; and
processing the intermediate version of the sequence of images with a second set of heuristics and rules of the artificial intelligence model to produce a final version of the sequence of images with a final resolution that is greater than the initial resolution and the intermediate resolution by first upscaling the sequence of images from the intermediate resolution to the final resolution and subsequently enhancing the sequence of images as upscaled to produce the final version of the sequence of images.

12. The method of claim 11 further comprising:
developing the first set of heuristics and rules of the artificial intelligence model and the second set of heuristics and rules of the artificial intelligence model using a training process that includes (1) the artificial intelligence model receiving a low resolution version of training images that are compressed from a genuine high resolution version of the training images, (2) the artificial intelligence model processing the low resolution version of the training images with the first set of heuristics and rules of the artificial intelligence model to output an intermediate resolution version of the training images, (3) the artificial intelligence model processing the intermediate resolution version of the training images with the second set of heuristics and rules of the artificial intelligence model to output an artificial high resolution version of the training images, (4) comparing the artificial high resolution version of the training images to the genuine high resolution version of the training images to identify an amount of difference therebetween, and (5) back-propagating the amount of the difference to the artificial intelligence model to adjust the first set of heuristics and rules of the artificial intelligence model and the second set of heuristics and rules of the artificial intelligence model so as to decrease the amount of the difference at future times.

13. The method of claim 12 further comprising:
capturing the sequence of images with a camera and a camera resolution that is greater than the compressed resolution,
wherein a difference between the camera resolution and the compressed resolution is equal to a maximum enhancement capability of the artificial intelligence model as determined during the training process.

14. The method of claim 13 wherein the final resolution is equal to the camera resolution.

15. The method of claim 13 further comprising:
capturing the genuine high resolution version of the training images with the camera and the camera resolution.

16. The method of claim 13 further comprising:
determining the maximum enhancement capability based on user feedback regarding an acceptability of the artificial high resolution version of the training images.

17. The method of claim 13 further comprising:
setting the final resolution to be less than the camera resolution based on one of user input received with the request for the sequence of images, a type of a source device that is a source of the request for the sequence of images, or a type of a connection to the source device.

18. The method of claim 12 further comprising:
capturing the sequence of images with a first camera and the compressed resolution.

19. The method of claim 18 wherein the genuine high resolution version of the training images are captured by a second camera with a capture resolution that is greater than the compressed resolution, wherein the second camera is associated with a user device, and wherein the genuine high resolution version of the training images depict an area monitored by the first camera.

20. The method of claim 11 further comprising:
transmitting the final version of the sequence of images to a source device that is a source of the request for the sequence of images,
wherein the memory device is collocated with a processor that processes the sequence of images in a cloud server that is remote from both the source device and a camera that captured the sequence of images.

* * * * *